United States Patent
Takaki

(10) Patent No.: US 11,420,624 B2
(45) Date of Patent: Aug. 23, 2022

(54) VEHICLE CONTROL APPARATUS AND VEHICLE CONTROL METHOD

(71) Applicant: DENSO CORPORATION, Kariya (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 209 days.

(21) Appl. No.: 16/438,777

(22) Filed: Jun. 12, 2019

(65) Prior Publication Data
US 2019/0291731 A1    Sep. 26, 2019

Related U.S. Application Data

(63) Continuation of application No. PCT/JP2017/041263, filed on Nov. 16, 2017.

(30) Foreign Application Priority Data

Dec. 14, 2016 (JP) .............................. JP2016-242669

(51) Int. Cl.
*B60W 30/095*    (2012.01)
*B60W 30/09*    (2012.01)
(Continued)

(52) U.S. Cl.
CPC ......... *B60W 30/0956* (2013.01); *B60R 21/00* (2013.01); *B60T 7/12* (2013.01);
(Continued)

(58) Field of Classification Search
CPC ............. B60W 30/0956; B60W 30/09; B60W 30/18145; B60W 30/18163;
(Continued)

(56) References Cited

U.S. PATENT DOCUMENTS 5,530,651 A * 6/1996 Uemura ................. G01S 15/86
701/301
6,504,473 B2 * 1/2003 Ichikawa ................. B60T 7/22
340/435
(Continued)

FOREIGN PATENT DOCUMENTS

JP    2004-043058 A    2/2004
JP    2008-305101 A    12/2008
(Continued)

*Primary Examiner* — Dale W Hilgendorf
*Assistant Examiner* — Hana Lee
(74) *Attorney, Agent, or Firm* — Maschoff Brennan

(57) ABSTRACT

When there is a possibility of collision between a host vehicle and objects positioned in a detection region in front of the host vehicle, an ECU implements collision avoidance control for preventing the host vehicle from colliding with an object. The ECU detects the objects positioned in the detection region and judges whether, among the detected objects, there is an object that the host vehicle has overtaken and that is capable of moving within a prescribed range in the vehicle width direction of the host vehicle. If it is judged that the host vehicle is turning to the left or to the right after it has been judged that the host vehicle has overtaken an object, the actuation timing of the collision avoidance control is advanced.

12 Claims, 10 Drawing Sheets

(51) Int. Cl.
    *B60W 30/18*    (2012.01)
    *G08G 1/16*     (2006.01)
    *B60T 7/12*     (2006.01)
    *B60R 21/00*    (2006.01)
    *G01C 21/26*    (2006.01)

(52) U.S. Cl.
    CPC ...... *B60W 30/09* (2013.01); *B60W 30/18145* (2013.01); *B60W 30/18163* (2013.01); *G08G 1/16* (2013.01); *G08G 1/166* (2013.01); *B60W 2420/42* (2013.01); *B60W 2554/00* (2020.02); *B60W 2554/804* (2020.02); *G01C 21/26* (2013.01)

(58) Field of Classification Search
    CPC ....... B60W 2554/804; B60W 2554/00; B60W 2420/42; B60R 21/00; B60T 1/12; G08G 1/16; G08G 1/166; G01C 21/26
    See application file for complete search history.

(56) References Cited

U.S. PATENT DOCUMENTS

2012/0296522 A1* 11/2012 Otuka ................ B60W 30/12
                                                    701/41
2018/0326995 A1* 11/2018 Hiramatsu .......... B60W 50/082

FOREIGN PATENT DOCUMENTS

| | | | |
|---|---|---|---|
| JP | 2009-043058 A | | 2/2009 |
| JP | 2009-122917 A | | 6/2009 |
| JP | 2009122917 A | * | 6/2009 |
| JP | 2010018162 A | * | 1/2010 |
| JP | 2010-102529 A | | 5/2010 |
| JP | 2010-102641 A | | 5/2010 |
| JP | 2011-170869 A | | 9/2011 |
| JP | 2012180055 A | * | 9/2012 |
| JP | 2015024713 A | * | 2/2015 |
| JP | 2015-141553 A | | 8/2015 |

* cited by examiner

VEHICLE CONTROL APPARATUS AND VEHICLE CONTROL METHOD

CROSS-REFERENCE TO RELATED APPLICATION

The present application is a continuation application of International Application No. PCT/JP2017/041263, filed Nov. 16, 2017, which claims priority to Japanese Patent Application No. 2016-242669, filed Dec. 14, 2016. The contents of these applications are incorporated herein by reference in their entirety.

BACKGROUND

Technical Field

The present disclosure relates to a vehicle control apparatus and a vehicle control method.

Related Art

When it is judged that there is a high probability of collision between a host vehicle and an object positioned in front of the host vehicle, a vehicle control apparatus performs control for avoiding collision with the object. The vehicle control apparatus judges the possibility of collision between the host vehicle and the object by using the results of detecting objects that are in front of the host vehicle.

SUMMARY

The present disclosure provides a vehicle control apparatus. In the present disclosure, when there is a possibility of collision between a host vehicle and objects positioned in a detection region in front of the host vehicle, the vehicle control apparatus implements collision avoidance control for preventing the host vehicle from colliding with an object. The vehicle control apparatus detects the objects positioned in the detection region and judges whether, among the detected objects, there is an object that the host vehicle has overtaken and that is capable of moving within a prescribed range in the vehicle width direction of the host vehicle. If it is judged that the host vehicle is turning to the left or to the right after it has been judged that the host vehicle has overtaken an object, the vehicle control apparatus advances the actuation timing of the collision avoidance control.

DETAILED DESCRIPTION OF THE PREFERRED EMBODIMENTS

Figure 1:
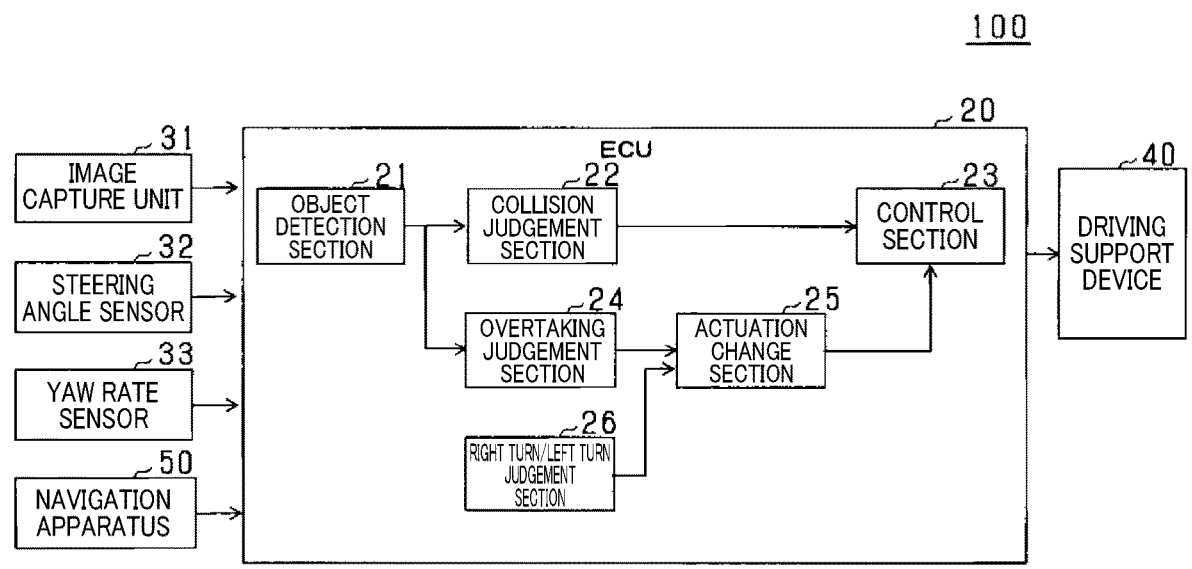
FIG. 1 is a block diagram illustrating a structure of a vehicle control apparatus.

The inventor of the present disclosure has studied the following technique related to a vehicle control apparatus.

A vehicle control apparatus is disclosed in JP 2009-122917 A whereby an image capture unit captures images of a region having a wide range that includes directions to the front and to the sides of the host vehicle, with the images captured by the image capture unit being used by the vehicle control apparatus for judging the possibility of collision between a pedestrian and the host vehicle. As a result of the image capture unit capturing images of a region that extends over a wide range that includes directions to the sides the host vehicle, the vehicle control apparatus can reduce blind spots, in which objects cannot be detected.

When the host vehicle is turning right or left at an intersection, the detection area will change together with the changes in direction of the host vehicle, and an object positioned at a blind spot may come within the detection area. In that case there is a danger that the object and the host vehicle will be close to one another when the object is detected, and that the timing of actuating the collision avoidance control will be delayed. In particular, when the detection area is limited to the front of the host vehicle, blind spots where the object cannot be detected will be larger than for the case in which the detection area extends over a wide range that includes directions to the sides of the host vehicle. As a result, there is an increased probability of an object entering the detection area from a blind spot while the host vehicle is turning right or left, and there is an increased frequency of delays in actuating the collision avoidance control.

It is an objective of the present disclosure to overcome the above problem, by providing a vehicle control apparatus and vehicle control method which can reduce the probability of collision with an object when a host vehicle is turning right or left.

To overcome the above problem, the present disclosure provides a vehicle control apparatus for performing collision avoidance control when there is a possibility of collision between a host vehicle and an object positioned in a detection region that is set in front of the host vehicle, to prevent the host vehicle from colliding with the object, where the vehicle control apparatus comprises an object detection section which detects objects positioned in the detection area, an overtaking judgement section which judges whether the host vehicle has overtaken an object that is among the objects detected in the detection area and that is capable of moving within a prescribed range in the vehicle width direction of the host vehicle, a right turn/left turn judgement section that judges whether the host vehicle is turning right or turning left, and an actuation change section which advances the actuation timing of the collision avoidance control when it is judged that the host vehicle is turning right or turning left after it has been judged that the host vehicle has overtaken an object, relative to the actuation timing when it is not judged that the host vehicle has overtaken an object, and to the actuation timing when it is judged that the host vehicle is not turning right or turning left after it has been judged that the host vehicle has overtaken an object.

With a vehicle control apparatus having the above configuration, when it is judged that there may be a collision between the host vehicle and an object positioned within the detection area in front of the host vehicle, collision avoidance control is implemented for avoiding collision with the object. With the detection area being limited to directions in front of the host vehicle, blind spots, within which an object that is positioned in a prescribed range in the width direction of the host vehicle cannot be detected, are larger than for the case in which the detection area covers a wide range that includes directions to the sides of the host vehicle. The larger the blind spots, the greater will become the probability that an object will enter the detection area from a blind spot as the host vehicle is making a right turn or a left turn, and the higher will become the frequency of delays in detecting such objects. If the detection of an object is delayed, then there is a danger that actuation of collision avoidance control for avoiding that the object may be delayed. Hence in that regard, the overtaking judgement section judges whether, among the objects that are detected, there is an object which the host vehicle has overtaken and that is capable of moving within a predetermined range in the vehicle width direction of the host vehicle, and the right turn/left turn judgement section judges whether the host vehicle is making a right turn or a left turn. If it is judged that the host vehicle is making a right turn or a left turn after it has been judged that the host vehicle has overtaken an object, then the actuation change section advances the actuation timing of collision avoidance control, relative to the case in which it is not judged that the host vehicle has overtaken an object and to the case in which it is judged that the host vehicle is not making a right turn or a left turn after it has been judged that the host vehicle has overtaken an object. The possibility of collision between the host vehicle and an object that enters the detection area from a blind spot, while the host vehicle is making a right turn or a left turn, can thereby be reduced.

The above and other objectives, features and advantages of the present disclosure will be made more clear by the following detailed description, given referring to the appended drawings.

In the following, embodiments of a vehicle control apparatus and a vehicle control method will be described referring to the drawings. It should be noted that in describing the embodiments, portions which are mutually identical or equivalent in the respective embodiments are designated by the same symbols, and the same descriptions are used.

First Embodiment

FIG. 1 shows a system 100 that is installed on a host vehicle for detecting objects positioned in front of the host vehicle. When there is a danger of collision between an object and the host vehicle, a mitigation operation for avoiding or mitigating the collision is implemented. With this embodiment, the system 100 includes various sensors 31 to 33, an ECU (Electronic Control Unit) 20 that functions as a vehicle control apparatus, a driving support apparatus 40 and a navigation apparatus 50.

Each of the sensors is connected to the ECU 20, and supplies detection results relating to objects to the ECU 20. As shown in FIG. 1, the sensors provided consist of an image capture unit 31, a steering angle sensor 32 and a yaw rate sensor 33.

Figure 2:
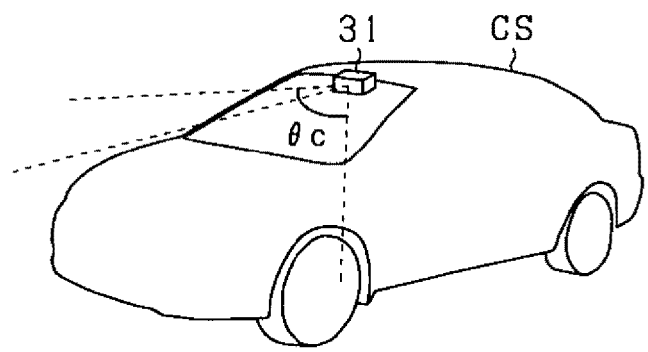
FIG. 2 is an oblique view of a host vehicle.

As shown in FIG. 2, the image capture unit 31 is disposed at the front of the host vehicle, such as to direct an imaging range, that extends in an angle of view θc in the vehicle width direction, ahead of the host vehicle CS. The image capture unit 31 acquires captured images of a region in front of the host vehicle, and outputs these images to the ECU 20 with a predetermined period. The image capture unit 31 is configured of imaging elements such as CCD (Charge Coupled Device) elements arrayed in vertical and horizontal directions, with the number of imaging elements being in accordance with the image resolution. The number of pixels in each acquired captured image by the image capture unit 31 is in accordance with the resolution of the image capture unit 31. With the present embodiment, the image capture unit 31 will be described for the case of a monocular camera, but it would be equally possible to use a stereo camera.

The navigation apparatus 50 provides road information concerning the road on which the host vehicle is traveling. The navigation apparatus 50 can include for example a memory for recording map information, and a location specifying unit for specifying the location of the host vehicle on a map by using position information transmitted from GPS (Global Positioning System) satellites. Hence the navigation apparatus 50 refers to road information concerning the surroundings of the host vehicle based upon the host vehicle position in a specific map. The referenced road information is then transmitted to the ECU 20. The road information can for example include curvature information indicating the state of curvature of the road on which the host vehicle is traveling, and information indicating whether there is a traffic intersection ahead of the host vehicle.

The ECU 20 is configured as a known type of computer, having a CPU, ROM, RAM, etc. By executing a program stored in the ROM, the CPU implements functions for calculating the positions of objects that are in front of the host vehicle and for using the calculated positions to judge the possibility of collision with an object.

Those functions implemented by the ECU 20 that relate to collision avoidance control will next be described.

Figure 3:
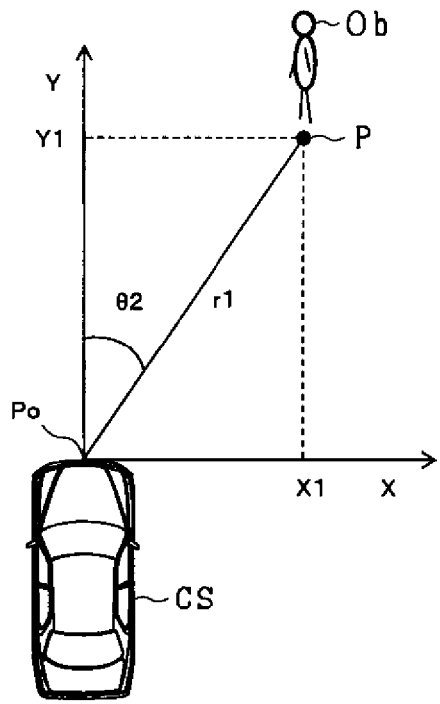
FIG. 3 is a diagram illustrating detection of an object.

The object detection unit 21 detects the relative position of an object with respect to the host vehicle based on the images captured by the image capture unit 31. As shown in FIG. 3, the object detection unit 21 detects, as the position of an object Ob, a linear distance r1 from the host vehicle to the object and an image orientation θ2 to the object based on the host vehicle. The position P of the object in an XY plane is then calculated using the detected linear distance r1 and the image orientation θ2, with the lateral direction of the host vehicle being taken as the X direction and the direction in which the imaging axis of the image capture unit 31 extends being taken as the Y direction. The XY plane in FIG. 3 is set with the center of the front of the host vehicle CS, in the vehicle width direction, as the reference point Po.

With the present embodiment, the object detection unit 21 uses the well-known template matching method to detect the linear distance r1 and the image orientation θ2 of an object recognized in a captured image. Specifically, the object detection unit 21 first recognizes an object in a captured image by executing template matching processing, using databases that have been stored beforehand. Databases are provided for each of respective types of object, and cover all of the shapes of an object. With the present embodiment a pedestrian or a two-wheeled vehicle are used as object image types. The linear distance r1 and the image orientation θ2 are calculated based on the position of the recognized object in a captured image.

Figure 4:
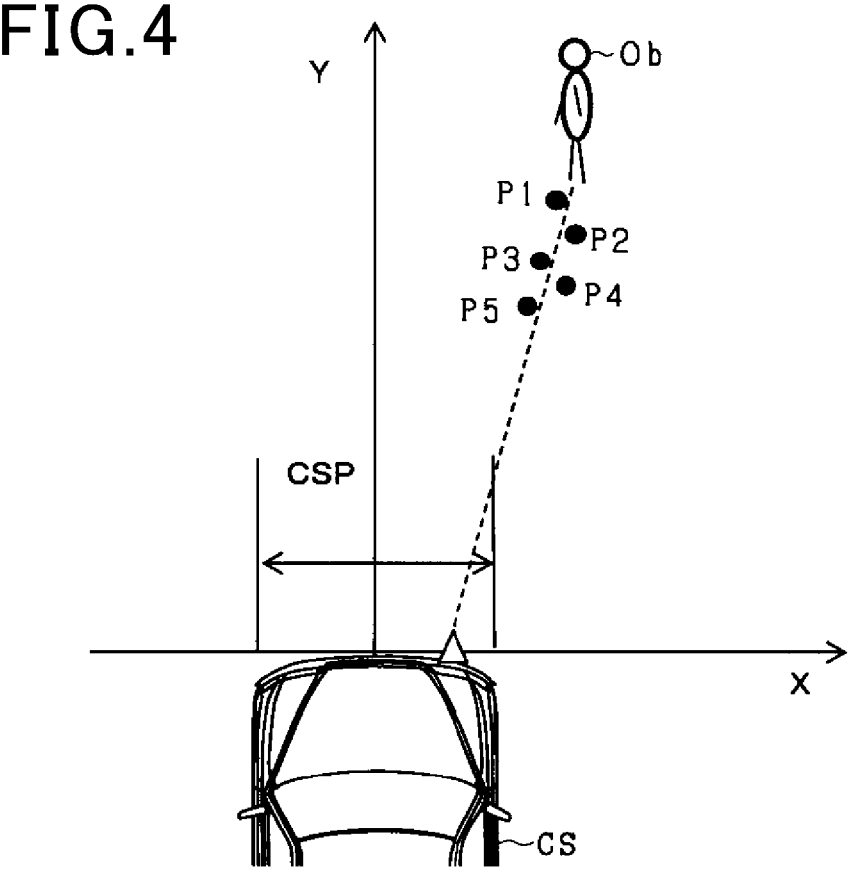
FIG. 4 is a diagram illustrating collision judgement performed with respect to an object.

The collision judgement section 22 judges, based on the position P of an object detected by the object detection unit 21, whether the host vehicle will collide with the object vehicle. As shown in FIG. 4 the collision judgement section 22 calculates the motion trajectory of the object based on different positions P of the object at a series of points in time. In FIG. 4, the motion trajectory is calculated based on the positions P1 to P5 of the object at times t1 to t5. With the calculated motion trajectory extended toward the host vehicle CS, it is judged that there is a possibility the host vehicle will collide with the object if the extension line of the motion trajectory comes within a collision lateral position range CSP that is set in front of the host vehicle.

When it is judged that the host vehicle may collide with an object, the control section 23 implements collision avoidance control for avoiding the collision. First, the control section 23 calculates a TTC (Time to Collision: collision margin time), which is an evaluation value indicating how many seconds will elapse until the host vehicle, traveling at its present speed, collides with the object. The control section 23 then compares the calculated TTC with an actuation threshold which determines the timing of actuating the collision avoidance control, and actuates the driving support device 40 if the TTC is equal to or less than the actuation threshold. The actuation threshold is a value for setting the actuation timing of the collision avoidance control. The higher the actuation threshold, the greater the value of TTC at which a collision avoidance operation is performed will become, and the more readily a collision avoidance operation will be actuated. The TTC can be calculated by dividing the distance between the object and the host vehicle, in the travel direction of the host vehicle, by the relative speed of the object with respect to the host vehicle. The relative speed can be calculated based on successive changes in the position P of the object over time.

The driving support device 40 is a warning device that emits a warning sound to the driver or a braking device that reduces the speed of the host vehicle, and performs operations for collision avoidance or for mitigating a collision based on the results of judgement by the collision judgement section 22. If the driving support device 40 is a braking device, a braking operation is performed to activate automatic braking when it is judged that the host vehicle and an object will collide. If the driving support device 40 is an alarm device, an alarm operation is performed for emitting an alarm sound when it is judged that the host vehicle will collide with an object.

Figure 5:
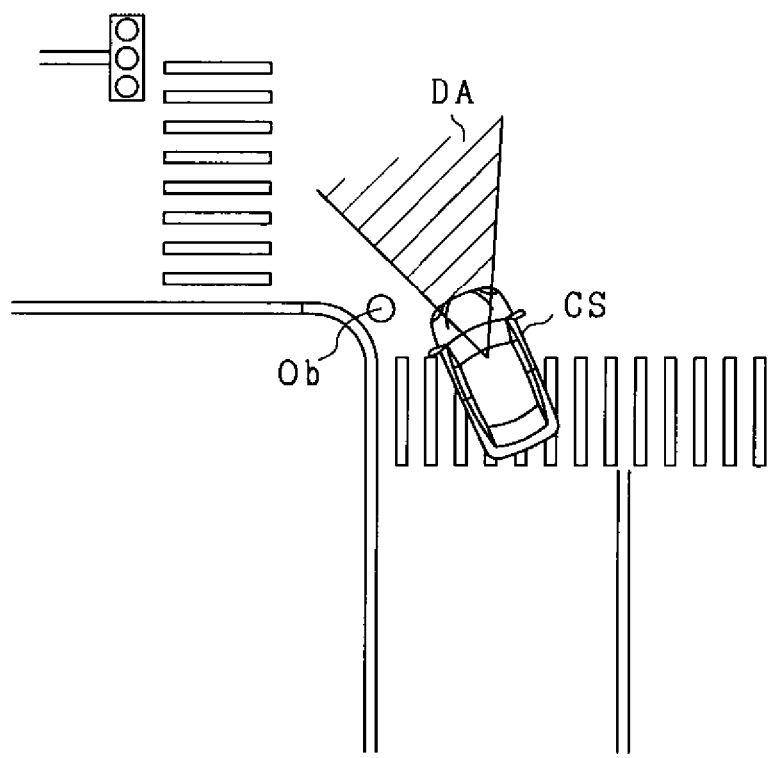
FIG. 5 is a diagram illustrating a relationship to an object located in the surroundings of the host vehicle when the host vehicle is making a right turn or a left turn.
Figure 6:
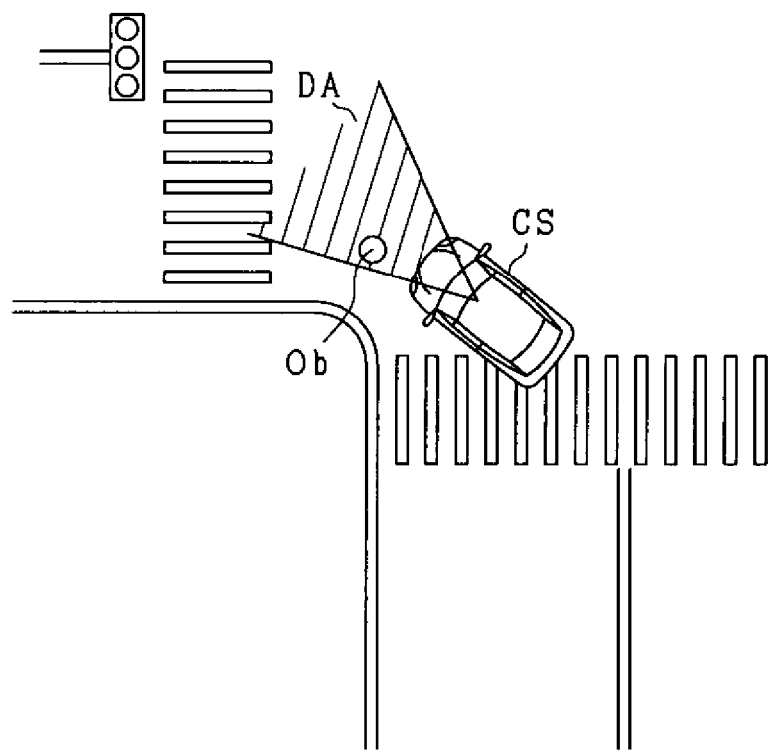
FIG. 6 is a diagram illustrating a relationship to an object located in the surroundings of the host vehicle when the host vehicle is making a right turn or a left turn.

It should be noted that if the detection region of the image capture unit 31 is limited to the front of the host vehicle, blind spots in which objects cannot be detected will be larger than for the case in which a wide detection region is used, that includes directions to the sides of the host vehicle. The larger the blind spots, the greater will become the probability that objects will enter a detection area from a blind spot, and the higher will become the frequency of delays in detecting these objects. In FIG. 5, when the host vehicle turns left at the intersection, an object Ob is located at a blind spot that is outside the detection area DA of the image capture unit 31, so that the ECU 20 cannot detect the position P of the object. As shown in FIG. 6, as the degree of turn of the host vehicle CS increases, the object comes within the detection area DA from the dead spot, and the ECU 20 then detects the position P of the object. In the example of FIG. 6, since the distance from the object Ob to the host vehicle CS in the travel direction of the host vehicle is short, there is a danger that the timing at which the ECU 20 actuates collision avoidance control with respect to the object Ob will be delayed.

Hence, to suppress delays in the actuation timing of collision avoidance control that is performed with respect to an object while the host vehicle is making a right or left turn, in the collision avoidance control performed by ECU 20, if it is judged that the host vehicle is making a left turn or a right turn after it has been judged that the host vehicle has overtaken an object, the actuation timing of the collision avoidance control is advanced, relative to the case in which it is not judged that the host vehicle has overtaken the object, and relative to the case in which it is not judged that the host vehicle is making a right or left turn after it has been judged that the host vehicle has overtaken the object.

Returning to FIG. 1, the overtaking judgement section 24 judges whether the host vehicle has overtaken an object, among the objects detected by the object detection unit 21, that is capable of moving within a predetermined range in the vehicle width direction of the host vehicle. With the present embodiment, the overtaking judgement section 24 judges whether the host vehicle has overtaken an object whose image type is that of a pedestrian or a two-wheeled vehicle. For example, if an object is recognized by using a database for pedestrians, the ECU 20 judges that the image type of the object is a pedestrian. If an object is recognized by using a database for two-wheeled vehicles, the ECU 20 judges that the image type of the object is a two-wheeled vehicle.

The right/left judgement section 26 judges whether the host vehicle is turning right or left. Here, "determining whether the host vehicle is turning right or left" can signify that the host vehicle is actually turning right or left, or that it is highly probable that the host vehicle is turning right or left. The right/left turn judgement section 26 can judge whether the host vehicle is turning right or left based on outputs from the steering angle sensor 32 or the yaw rate sensor 33, for example.

If it is judged that the host vehicle is turning right or left after it has been judged that the host vehicle has overtaken an object, the actuation change section 25 advances the actuation timing of collision avoidance control, relative to the case in which it is not judged that the host vehicle has overtaken an object, and to the case in which it is judged that the host vehicle is not making a right or left turn after it is judged that the host vehicle has overtaken an object. With the present embodiment, the actuation change section 25 advances the actuation timing of collision avoidance control by increasing an actuation threshold.

Figure 7:
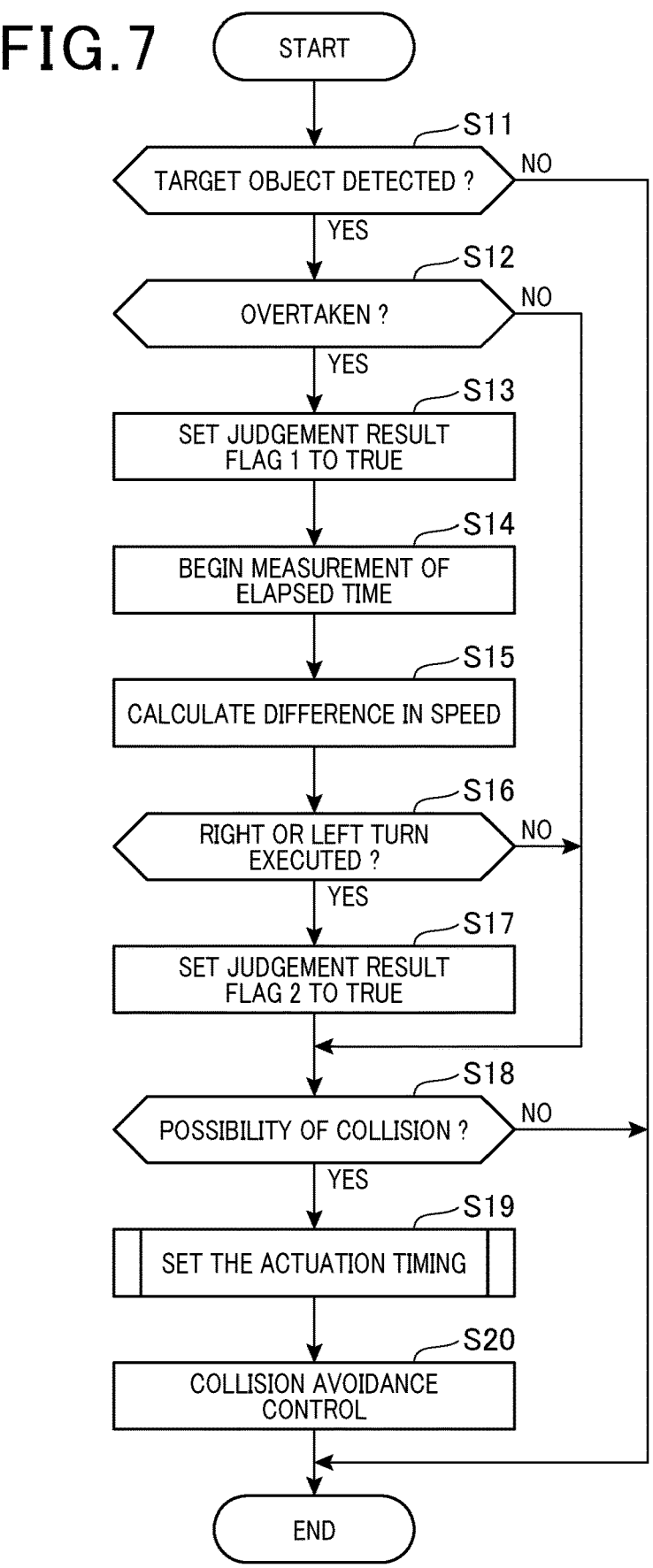
FIG. 7 is a flowchart illustrating collision avoidance control performed by an ECU.

Next, the collision avoidance control implemented by the ECU 20 will be described referring to FIG. 7. The processing shown in FIG. 7 is executed by the ECU 20 with a predetermined period. In this example, a case is described in which a pedestrian traveling parallel to the host vehicle is to be detected.

In step S11, a decision is made as to whether a target object is detected. A pedestrian who is moving in the same direction as the host vehicle, and whose distance from the host vehicle in the vehicle width direction is equal to or less than a threshold, is detected as an object that can move within a predetermined range in the vehicle width direction of the host vehicle. The motion direction of the pedestrian is judged based on a time-axis sequence of changes in position P of the pedestrian. Step S11 corresponds to an object detection step.

Figure 8:
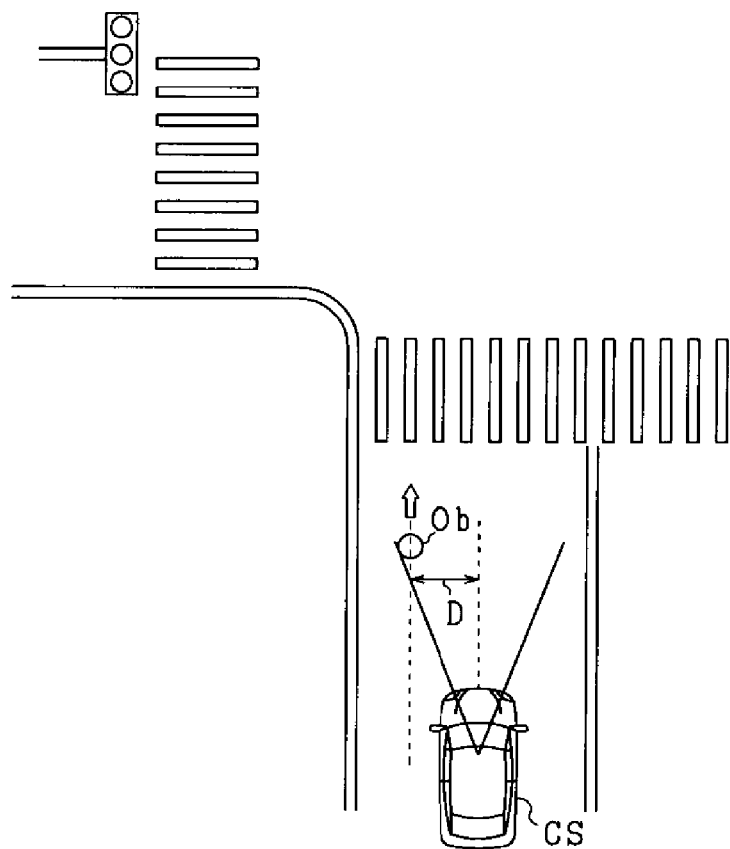
FIG. 8 is a diagram illustrating operations when the host vehicle has overtaken a pedestrian.

In FIG. 8, the ECU 20 detects a pedestrian who is moving in the same travel direction as the host vehicle, with the distance D from the center of the host vehicle CS to the pedestrian, in the vehicle width direction, being equal to or less than a threshold Th1. The threshold Th1 is set based on the distance from the center of the object to a side of the detection area, as measured in the vehicle width direction. If no target object is detected (step S11: No), this execution of the processing of FIG. 7 is ended.

Figure 9:
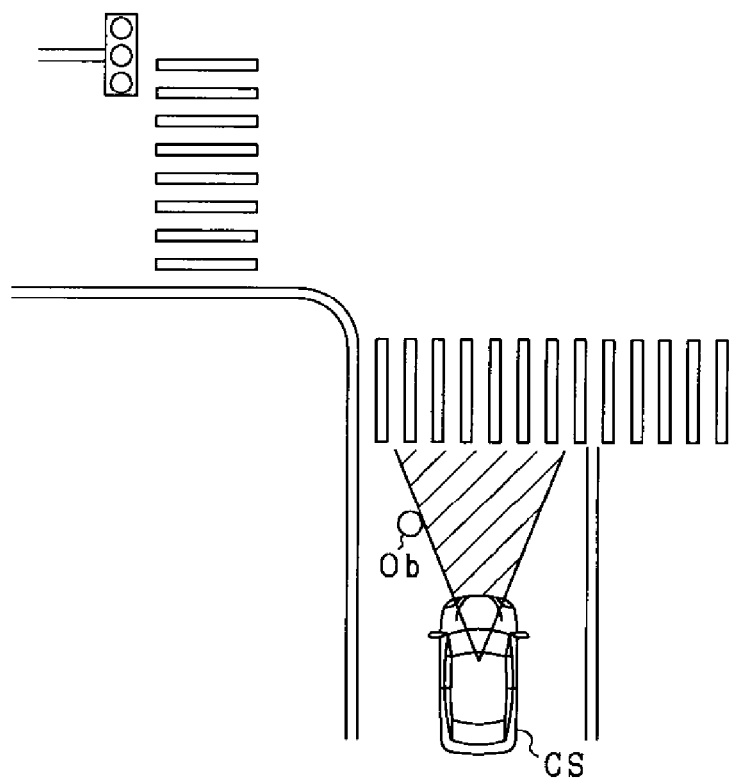
FIG. 9 is a diagram illustrating operations when the host vehicle has overtaken a pedestrian.

If a target object is detected (step S11: Yes), a decision is made in step S12 as to whether a pedestrian has been overtaken. When an object has been detected in a captured image as shown in FIG. 8, if that same object is not thereafter detected in the detection area, as shown in FIG. 9, then it is judged that the target object has been passed by. Step S12 corresponds to an overtaking judgement step.

If it is judged that a pedestrian has been overtaken (step S12: Yes) then in step S13 a judgement result flag 1 that indicates whether a pedestrian has been overtaken is set to true. On the other hand, if it is not judged that a pedestrian has been overtaken (step S12: No), the processing proceeds to step S18.

In step S14, measurement of elapsed time is commenced. The elapsed time is information representing the amount of time that has elapsed after it was judged that the host vehicle has overtaken the pedestrian. Step S14 corresponds to a measurement section.

In step S15 the speed difference between the pedestrian and the host vehicle, in the travel direction of the host vehicle, is calculated. The speed difference can for example be calculated based on time-axis changes in the position of the pedestrian, detected in executions of step S11. Step S15 corresponds to a speed difference calculation section.

In step S16 a decision is made as to whether the host vehicle is turning right or left. With the present embodiment, it is judged that the host vehicle is making a right turn or left turn if an amount of change in the steering angle detected by the steering angle sensor 32 is above a prescribed value. Alternatively, the decision as to whether the host vehicle is making a right turn or left turn could be made based on detection results from the yaw rate sensor 33, with respect to the vehicle width direction. Step S16 corresponds to a turning judgement step.

If it is judged that the host vehicle is turning right or left (step S16: Yes) then in step S17 a judgement result flag 2, which indicates whether the host vehicle is turning right or left, is set to true. On the other hand if it is not judged that the host vehicle is turning right or left (step S16: No), the processing proceeds to step S18.

In step S18, the possibility of collision with a pedestrian is judged. The motion locus of the pedestrian is calculated based on the position P of the pedestrian at successively different time points, and the possibility of collision between the host vehicle and the pedestrian is judged based on this motion locus. If it is judged that there is no possibility of a collision with the pedestrian (step S18: No), this execution of the processing of FIG. 7 is ended.

A high reliability of recognition of a pedestrian by the ECU 20 could be made a condition for judging the possibility of collision between the host vehicle and the pedestrian in step S18. In that case, the reliability of recognition of the pedestrian could be calculated based on the cumulative number of times that the pedestrian is detected. For example, performing of the collision possibility judgement in step S18 could be limited to only pedestrians whose cumulative detection count is equal to or greater than a threshold value.

Figure 10:
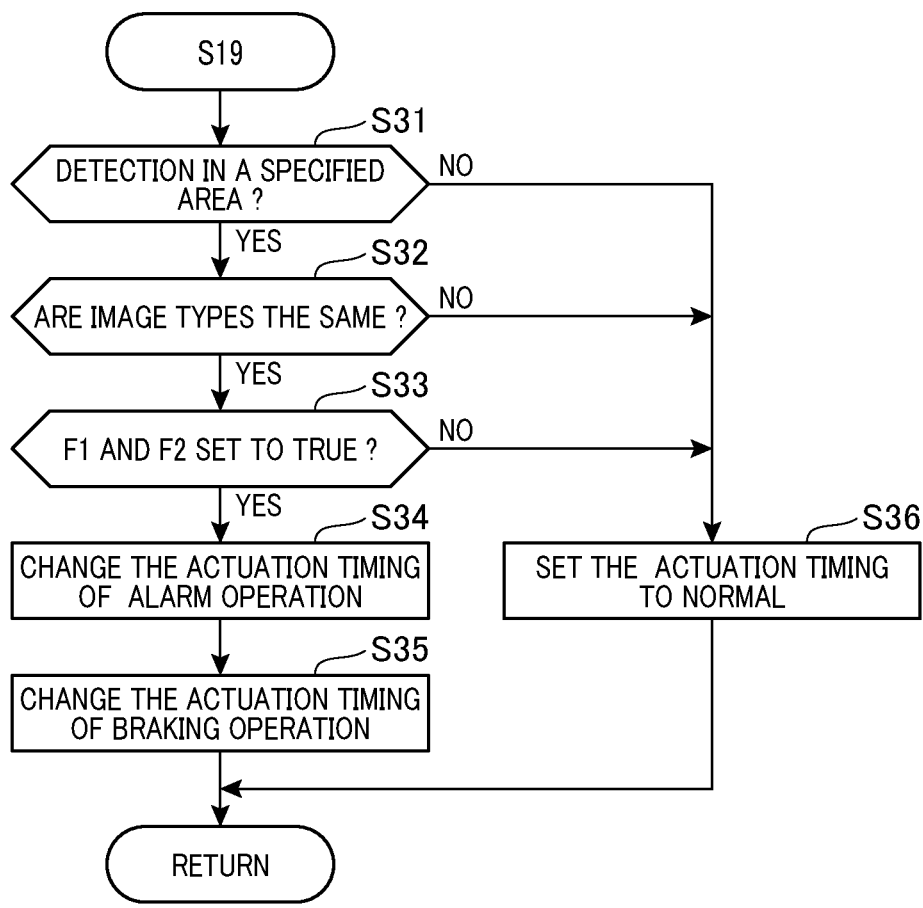
FIG. 10 is a flowchart illustrating processing performed in step S19 of FIG. 7.

On the other hand if it is judged that there is a possibility of collision (step S18: Yes) then an actuation threshold that specifies the actuation timing of the collision avoidance control is set in step S19. FIG. 10 is a flowchart for describing details of the processing of step S19. Step S19 corresponds to an actuation change step.

If an object is positioned at the center of the detection area after the host vehicle turns to the right or left, it is highly likely that the object was located in the detection area since before the host vehicle made the turn, and if the actuation timing is advanced with respect to such objects, this can result in unnecessary actuations of the collision avoidance control, which is undesirable. Hence a decision is made first, in step S31, as to whether a pedestrian who has been judged to have a possibility of collision with the host vehicle has been detected in a peripheral portion of the detection area, with respect to the vehicle width direction.

Figure 11:
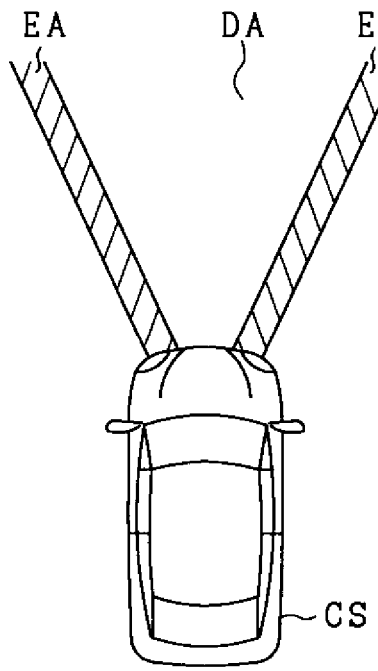
FIG. 11 is a diagram illustrating a corresponding region in the detection area.

If a pedestrian is detected in an edge area EA, with respect to the X-axis direction in a captured image as illustrated in FIG. 11, then it is judged that the pedestrian is positioned at a peripheral edge of the detection area, with respect to the vehicle width direction. Specifically, if a pedestrian is detected in an edge area EA of the detection area DA which is at the side of the turning direction (rightward or leftward direction) of the host vehicle, then it is judged that the pedestrian is positioned at a peripheral edge of the detection area, with respect to the vehicle width direction. Step S31 corresponds to a position judgement section.

If a pedestrian is detected at a peripheral edge of the detection area (step S31: Yes), then in step S32 a decision is made as to whether an object being overtaken by the host vehicle and an object that is judged to have a possibility of collision with the host vehicle are the same object. With the present embodiment, the judgement of step S32 is performed based upon whether the image type of the object that was detected in step S11 of FIG. 7 is the same as the image type of the object that is subjected to collision judgement in step S18. For example, the judgement can be performed based on the type of database used for object recognition. If the image types are not the same (step S32: No) then the processing proceeds to step S36. Step S32 corresponds to a same object judgement section.

If the image types are the same (step S32: Yes), a decision is made in step S33 as to whether both of the judgement result flag 1 and the judgement result flag 2 are set to true. If the formation flag 1 and the formation flag 2 are not both set to true (step S33: No), the processing proceeds to step S36.

On the other hand if both the judgement result flag 1 and the judgement result flag 2 are set to true (step S33: Yes), then in step S34 the actuation timing of an alarm operation, and in step S35 the actuation timing of a braking operation, are respectively advanced, relative to the case in which the judgement result flag 1 and the judgement result flag 2 are not both true.

Figure 12:
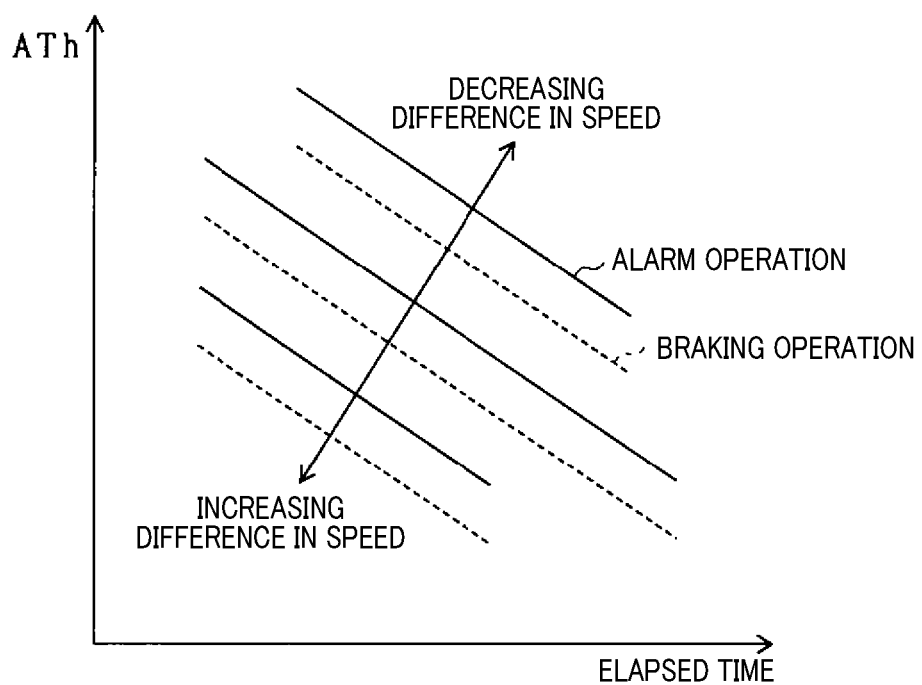
FIG. 12 is a diagram illustrating a change in an actuation threshold value.

FIG. 12 is a diagram for explaining changing of the actuation threshold. FIG. 12 is a graph in which the horizontal axis represents values of time that have elapsed since measurement was started in step S14, and the vertical axis represents values of the actuation threshold ATh. The ECU 20 may for example hold a map corresponding to the graph shown in FIG. 12, and refer to the actuation threshold ATh by referring to this map.

If only a short time elapses from the point at which the host vehicle overtakes a pedestrian until the host vehicle turns to the right or to the left, it is likely that the pedestrian will be positioned near the host vehicle, and hence it is highly probable that the pedestrian will enter the detection area from a blind spot as the host vehicle is making the right turn or left turn. Hence as shown in the graph of FIG. 12, the actuation threshold ATh is set such that the actuation timing of an alarm operation becomes more advanced in accordance with shortening of the elapsed time, whose values are plotted along the horizontal axis. Specifically, the values are defined such that the shorter the elapsed time, the higher becomes the actuation threshold ATh.

Furthermore if the host vehicle makes a right or left turn when it has overtaken an object and there is only a small difference in speed between the host vehicle and the object, then it is highly probable that the object will enter the detection area from a blind spot. Hence as shown in the graph of FIG. 12, the actuation threshold ATh is set such that the actuation timing of an alarm operation becomes more advanced in accordance with decrease of the speed difference calculated by step 15. Specifically, the value is defined such that the smaller the speed difference, the higher becomes the actuation threshold ATh.

Furthermore by performing an alarm operation earlier than a braking actuation, the driver can be notified by the alarm sound of the possibility of collision with an object, and so will be impelled to take actions for avoiding the collision. Hence in the graph shown in FIG. 12, each actuation threshold is set such that the degree of advancement of the actuation timing of an alarm operation is greater than the degree of advancement of the actuation timing of a braking operation. Specifically, for the same value of elapsed time and same value of speed difference, the actuation threshold of an alarm operation is set higher than the actuation threshold of a braking operation.

In step S36, the actuation timing is set to an initial value. The actuation threshold set in step S36 is such that the actuation timing is delayed in relation to the actuation timings that are set in S34 and S35.

Referring back to FIG. 7, collision avoidance control is performed in step S20 using the actuation threshold value that was set in step S19. Since the actuation threshold is increased, the actuation timing of the collision avoidance control is advanced.

The following advantageous effects are obtained by the embodiment described above.

If it is judged that the host vehicle is turning right or left after it has been judged that the host vehicle has overtaken an object, the ECU 20 advances the actuation timing of collision avoidance control, relative to the case in which it has not been judged that the host vehicle has overtaken an object, and relative to the case in which it has been judged that the host vehicle has overtaken an object but it is not judged that the host vehicle is turning right or left. The possibility of collision between the host vehicle and an object that enters the detection area from a blind spot, as the host vehicle is making a right turn or a left turn, can thereby be reduced.

The ECU 20 detects an object that is moving in the same direction as the host vehicle and having a distance from the host vehicle that is less than a threshold, as being an object that can move within a predetermined range in the vehicle width direction. In this case, by narrowing the scope of detection beforehand to objects that are likely to enter the detection area as a result of turning of the host vehicle to the right or left, objects that are unlikely to enter the detection area as a result of the turning can be excluded. The actuation timing of the collision avoidance control can thereby be set appropriately.

If only a short time elapses from the point at which the host vehicle overtakes an object until the host vehicle turns the right or left, it is likely that the object is close to the host vehicle, and that the object will enter the detection area from a blind spot as the host vehicle is making the right or left turn. Hence the ECU 20 measures the time that elapses from the point at which it is judged that the host vehicle has overtaken an object until it is judged that the host vehicle is turning to the right or left, and when the actuation timing is changed, the shorter the elapsed time, the more advanced is made the actuation timing. The amount of change in the actuation timing can thereby be appropriately set by using the elapsed time for judging the possibility that the object will enter the detection area from a blind spot.

If the host vehicle turns to the right or left when it overtakes an object and the difference in speed between the host vehicle and the object is small when the object is overtaken, then it is highly probable that the object will be only a short distance from the host vehicle when it turns, and that the object will enter the detection area from a blind spot as the host vehicle is turning. Hence the ECU 20 calculates the difference in speed between the host vehicle and the object with respect to the travel direction of the host vehicle, and when the actuation timing is changed, the smaller the speed difference the more advanced is made the actuation timing. The amount of change in the actuation timing can thereby be appropriately set, by using the relative speed for judging the possibility that the object will enter the detection area from a blind spot.

An object that is positioned in a peripheral portion of the detection area with respect to in the vehicle width direction, after the host vehicle makes a right or left turn, is highly likely to be an object that has entered the detection area from a blind spot as the host vehicle was turning to the right or left. On the other hand, an object that is positioned at the center of the detection area after the host vehicle makes a right or left turn is likely to have been positioned in the detection area since before the host vehicle made the turn. If the actuation timing is advanced with respect to an object that was located in the detection area since before the host vehicle made the right or left turn, this will result in unnecessary operation of the collision avoidance control, which is undesirable. Hence when it is judged that there is a possibility of collision between an object and the host vehicle, the ECU 20 determines whether that object has been detected within a peripheral portion of the detection area, with respect to the vehicle width direction. If it is judged that there is a possibility of collision between the object and the host vehicle, the actuation timing is then changed only if the object has been detected in a peripheral portion of the detection area, with respect to the vehicle width direction. Unnecessary operations for objects can thereby be suppressed, by omitting to change the actuation timing in the case of an object that was within the detection area prior to the host vehicle making a right or left turn.

When performing an alarm operation for generating an alarm sound and a braking operation for implementing automatic braking, as collision avoidance control, if the alarm operation for notifying the driver of the possibility of a collision by means of the alarm sound is performed earlier than the braking operation, the driver can be prompted to perform avoidance operations for preventing collision with an object. Hence when changing the actuation timings of alarm operations and braking operations, the ECU 20 makes the degree of advancement of the actuation timing of an alarm operation greater than the degree of advancement of a braking operation. In that case when the actuation timings are advanced, an alarm operation is performed prior to a braking operation, thereby increasing the probability that the driver himself or herself will perform avoidance operations in response to the alarm sound, thus enabling the frequency of actuating automatic braking to be lowered.

The ECU 20 detects objects based on images captured by an image capture unit 31. Similar effects to those of the present disclosure can be obtained for a configuration that incorporates an image capture unit.

The ECU 20 advances the actuation timing when it is judged that the host vehicle is turning right or left after it has been judged that the host vehicle has overtaken an object, relative to the actuation timing when it is judged that the host vehicle is not making a right or left turn after overtaking the object, on condition that the object judged to be overtaken by the host vehicle and an object that has been judged to have a possibility of collision with the host vehicle are determined to be the same object. The actuation timing can thereby be appropriately set, since there is an increased probability of changing the actuation timing with respect to an object that has been overtaken.

The ECU 20 judges whether, among the detected objects, there is an object that is recognized as a pedestrian or a motorcycle and that has been overtaken by the host vehicle. The probability of the host vehicle colliding with a pedestrian or a two-wheeled vehicle can thereby be reduced, by advancing the actuation timing in the case of a pedestrian or two-wheeled vehicle that might readily be located in a blind spot.

Second Embodiment

Figure 13:
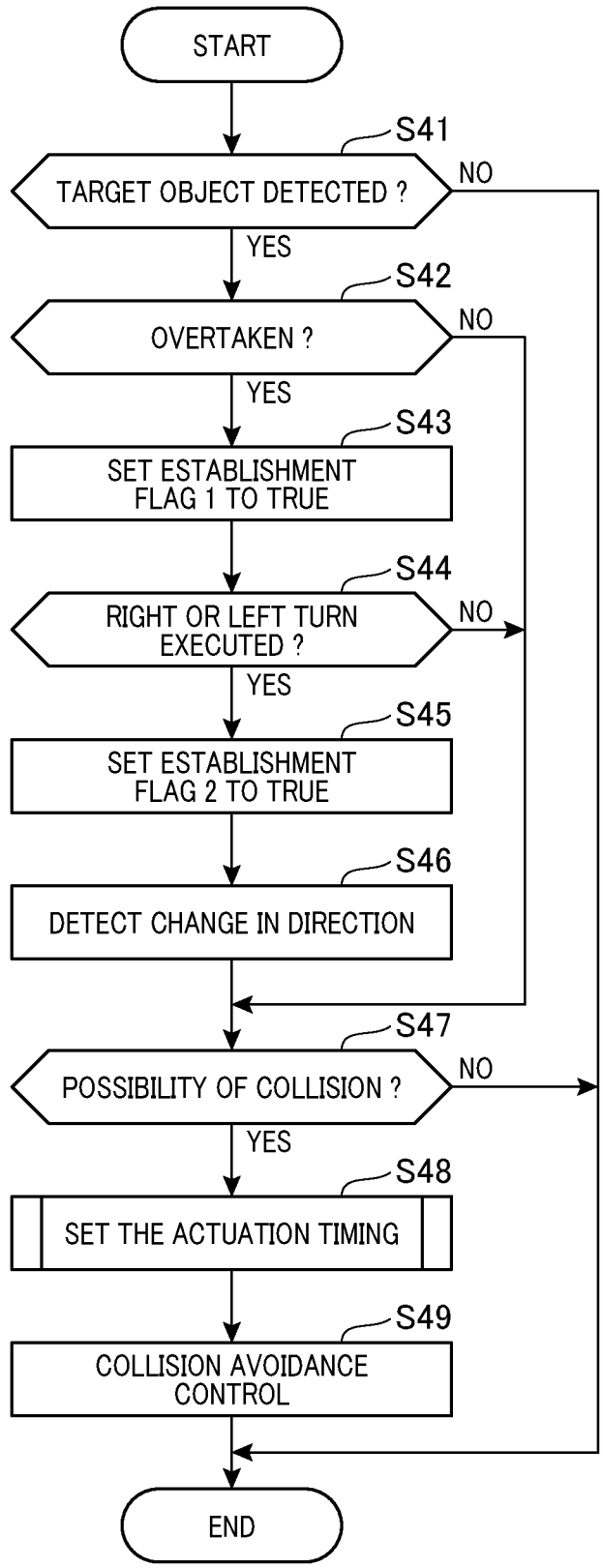
FIG. 13 is a flowchart illustrating collision avoidance control that is performed by an ECU in a second embodiment.

A second embodiment will be described, having a different configuration from the first embodiment. FIG. 13 is a flowchart for describing processing that is executed by the ECU 20 of the second embodiment. Among the steps in FIG. 13, steps S41 to S43 respectively correspond to S11 to S13, steps S44 and S45 respectively correspond to S16 and S17, and S47 to S49 respectively correspond to steps S18 to S20.

Firstly, when a target object is detected (step S41: Yes), a decision is made in step S42 as to whether a pedestrian has been overtaken. If it is judged that a pedestrian has been overtaken (step S42: Yes) then a judgement result flag 1, indicating that a pedestrian has been overtaken, is set to true in step S43. If it is not judged that a pedestrian has been overtaken (step S42: No), the processing proceeds to step S47.

If it is judged that the host vehicle is turning right or left (step S44: Yes), then a judgement result flag 2 indicating that the host vehicle is turning right or left is set to true in step S45, and step S46 is executed. On the other hand if it is not judged that the host vehicle is turning right or left (step S44: No), the processing proceeds to step S47.

If it is judged in step S44 that the host vehicle is turning right or left, then in step S46 the change in direction of the host vehicle is detected. With the present embodiment, the ECU 20 detects the amount of change in the direction of the host vehicle, when the host vehicle turns right or left, based on detection result from the steering angle sensor 32. Step S46 corresponds to a direction change detection unit. Alternatively, the amount of change in direction of the host vehicle when the host vehicle turns right or left could be detected based on an output from the yaw rate sensor 33.

In step S47 the possibility of collision with the pedestrian is judged. The ECU 20 calculates the motion trajectory of the pedestrian based on the positions P of the pedestrian at different points in a time sequence, and judges the possibility of collision between the host vehicle and the pedestrian based on the motion trajectory. If there is no possibility of collision with the pedestrian (step S47: No), this execution of the processing of FIG. 13 is ended.

If it is judged that there is a possibility of a collision with the pedestrian (step S47: Yes) then an actuation threshold is set in step S48, which defines the actuation timing of the collision avoidance control.

The processing of step S48 with the second embodiment will be described using the flowchart of FIG. 10. In the flowchart of FIG. 10, if both of the judgement result flag 1 and the judgement result flag 2 are set to true (step S33: Yes) then in step S34, the actuation timing of an alarm operation is advanced relative to the case in which the judgement result flag 1 and the judgement result flag 2 are not both set to true.

Figure 14:
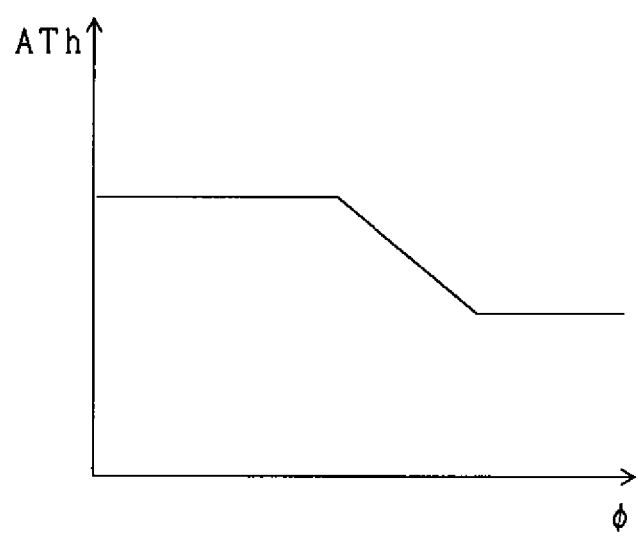
FIG. 14 is a diagram illustrating a change of the actuation threshold in the second embodiment.

FIG. 14 is a diagram describing changing of the actuation threshold. FIG. 14 is a graph expressing amounts of change in direction (values of steering angle φ) of the host vehicle that are detected in step S46, along the horizontal axis, and values of the actuation threshold ATh along the vertical axis. The ECU 20 can for example hold a map corresponding to the graph shown in FIG. 14, and refer to the actuation threshold ATh by referring to this map.

In the map shown in FIG. 14, values are defined such that the actuation threshold ATh increases as the steering angle φ decreases. In advancing the actuation timing, relative to the case in which it is not judged that the host vehicle is turning right or left after it is judged that the host vehicle has overtaken a pedestrian, the smaller the steering angle φ, the greater is made the degree to which the ECU 20 advances the actuation timing, by referring to the map shown in FIG. 14.

Figure 15:
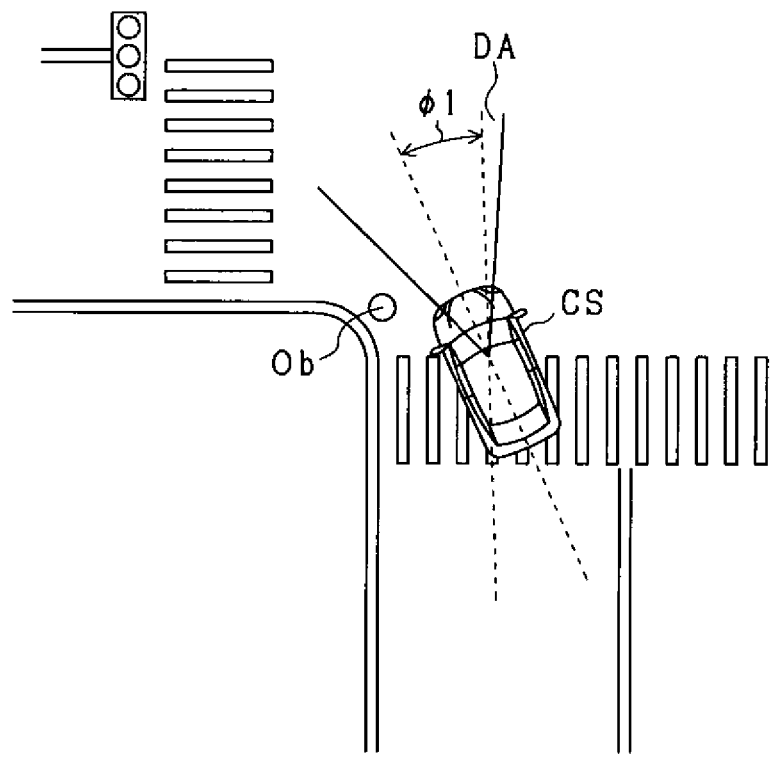
FIG. 15 is a diagram illustrating a change in the direction of the host vehicle as a steering angle φ.
Figure 16:
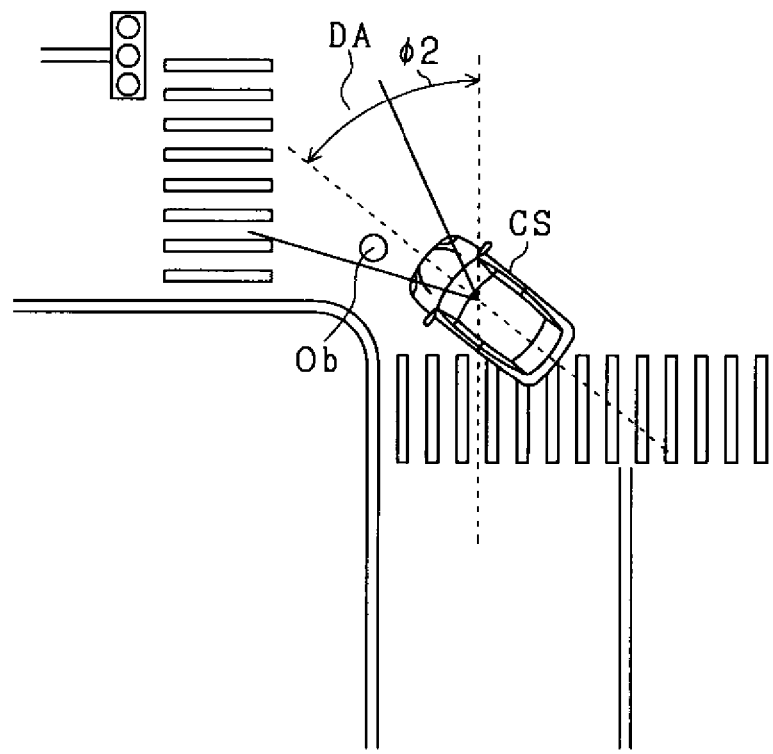
FIG. 16 is a diagram illustrating a change in the direction of the host vehicle as a steering angle φ.

Relationships between changes in the direction of the host vehicle and an object that enters the detection area from a blind spot will be described using FIGS. 15 and 16. FIGS. 15 and 16 show a case in which, after traveling straight along a road, the host vehicle CS makes a change in direction by an angle φ, at an intersection. In both FIGS. 15 and 16 it is assumed that a pedestrian Ob is passing along the road such as to travel parallel to the host vehicle CS.

The steering angle φ2 in FIG. 16, indicating a change in the direction of the host vehicle, is larger than the steering angle φ1 in FIG. 15. The smaller the amount of change in the direction of the host vehicle when it turns to the right or left, the greater becomes the probability that there will be a pedestrian in a blind spot, outside the detection area. In FIG. 15 the steering amount is smaller than that in FIG. 16, and the pedestrian Ob is outside the detection area. If an object has not entered the detection area DA and so is not detected, there is a danger that the object will subsequently enter the detection area from a blind spot, and become positioned in front of the host vehicle. Hence the ECU 20 detects the amount of change in the steering angle φ when the host vehicle turns right or left, and when the actuation timing is changed, the actuation threshold is changed such that the smaller the detected change in the steering angle φ the more advanced is made the actuation timing, as shown in FIG. 14.

Returning to FIG. 13, collision avoidance control is performed in step S49 by using the actuation threshold value that is set in step S48.

The following advantageous effects are obtained with the embodiment described in detail above.

The smaller the change in direction of the host vehicle when turns to the right or left, the greater becomes the probability that there is an object which is in a blind spot, outside the detection area, and the higher becomes the probability that the object will come within the detection area thereafter. Hence the ECU 20 detects changes in the direction of the host vehicle when it is turning right or left, and when changing the actuation timing, the smaller the detected change in direction, the more advanced is made the actuation timing. The actuation timing can thereby be appropriately set, by using the changes in direction of the host vehicle as it is turning to the right or left for judging the possibility that an object will enter the detection area.

Other Embodiments

It would be possible for the ECU 20 to shorten the time required for performing a collision judgement, and thereby advance the actuation timing of collision avoidance control, by reducing the number of motion trajectory reference points used in calculating a motion trajectory for the purpose of collision judgement. In that case, if both the judgement result flag 1 and the judgement result flag 2 are set to true, the ECU 20 would decrease the number of reference points used in calculating the motion trajectory in step S18 of FIG. 7.

The operation could be made such that, if it is judged in step S18 that the recognition reliability is high and that collision between the host vehicle and a pedestrian is likely, actuation of the collision avoidance control would be advanced only if the cumulative number of times the pedestrian has been detected is above a threshold value. Specifically, in steps S34 and S35 of FIG. 10, the ECU 20 would advance the actuation of the collision avoidance control only if the cumulative number of times the pedestrian has been detected exceeds the threshold value. With that configuration, proper detection of a pedestrian is made a necessary condition for advancing the actuation of the collision avoidance control, so that unnecessary actuation can be suppressed.

It would be possible for the ECU 20 to judge whether the host vehicle is turning right or turning left based on road information produced from the navigation apparatus 50. In that case when the road in front of the host vehicle is curved, as indicated by the road information, the ECU 20 would judge that the host vehicle is turning to the right or to the left. It would also be possible for the ECU 20 to judge whether the host vehicle is turning to the right or to the left based on actuation of a blinker by the driver, as a signal indicating a turn to the right or left.

The ECU 20 could be configured such that the actuation timing is held unchanged if the speed at which the host vehicle overtakes a target object exceeds a predetermined value. In that case for example, if the speed of the host vehicle is judged to be less than the predetermined value in step S12 of FIG. 7, the processing would proceed to step S13, while if the host vehicle speed is equal to or greater than the predetermined value, the processing would proceed to step S18. The threshold could be set to a value between 60 km/h and 100 km/h for example.

In step S32 of FIG. 10, when the ECU 20 judges whether an object which the host vehicle has overtaken and an object that has been judged to possibly collide with the host vehicle are the same object, feature quantities of the shapes of these objects could be used in setting a condition for that judgement, in addition to the judgement condition that the respective image types of the objects should be the same. In that case, if the ECU 20 detects an object in step S11 of FIG. 7, the height dimension and the width dimension of the object would be calculated based on a captured image, and registered. A decision would then be made, in step S32 in FIG. 10 as to whether an object for which collision judgement was performed in step S18 and the object overtaken by the host vehicle have the same image type, together with a judgement as to whether the recorded height dimensions and width dimensions of the respective objects are close. If the results of both of these judgements are positive (step S32: Yes) the processing would proceed to step S33, in which the flags are judged. With the above configuration, the actuation timing of the collision avoidance control is advanced only when it is highly probable that an object which the host vehicle has overtaken and an object that has been judged to possibly collide with the host vehicle are the same object, so that unnecessary actuation of collision avoidance control can be suppressed. It should be noted that it would be possible for the judgement in step S32, as to whether the objects are the same, to be performed by using only the feature quantities of the object shapes as a condition for that judgement.

It would be possible for the ECU 20 to use an electromagnetic wave sensor instead of the image capture unit 31, for detecting objects. In that case the ECU 20 would detect objects that are within a detection region of the electromagnetic wave sensor.

Although the present disclosure has been described according to embodiments, it is to be understood that the present disclosure is not limited to these embodiments and structures. The present disclosure encompasses various modified examples, and changes that come within an equivalent scope. Furthermore various combinations and forms, including combinations and forms that contain more than one or less than one of the elements, also come within the scope and conceptual range of the present disclosure.

What is claimed is:

1. A vehicle control apparatus for performing collision avoidance control when there is a possibility of collision between a host vehicle and an object positioned within a detection region that is set in front of the host vehicle, to prevent the host vehicle from colliding with the object, the apparatus comprising:

an object detection section for detecting objects positioned within the detection region;

an overtaking judgment section for judging whether the host vehicle has overtaken and passed by the object that is among the objects detected in the detection region and that is capable of moving within a prescribed range in a vehicle width direction of the host vehicle;

a right turn/left turn judgment section for judging whether the host vehicle is turning right or turning left;

a direction change detection section for detecting a change in direction of the host vehicle when it is judged that the host vehicle is turning right or turning left;

an actuation change section for advancing an actuation timing of the collision avoidance control when it is judged that the host vehicle is turning right or turning left after it has been judged that the host vehicle has overtaken and passed by the object, relative to the actuation timing when it is not judged that the host vehicle has overtaken and passed by the object and relative to the actuation timing when it is judged that the host vehicle is not turning right or turning left after it has been judged that the host vehicle has overtaken and passed by the object; and a position judgment section for determining, for the object that is judged to have a possibility of collision with the host vehicle, whether the object is positioned within a specific area within the detection region, in a case where the host vehicle makes the right or left turn after the host vehicle has overtaken and passed by the object, the specific area being on a side of a turning direction of the host vehicle, wherein:

the actuation change section advances the actuation timing in response to determining that the object is positioned within the specific area within the detection region; and when the actuation timing is advanced by the actuation change section, the smaller the change in direction, the greater a degree of advancement of the actuation timing is made.

2. The vehicle control apparatus according to claim 1, wherein the overtaking judgment section detects the object that is moving in the same direction as the host vehicle, and that is at a distance from the host vehicle which is below a threshold value with respect to the vehicle width direction of the host vehicle, as being the object capable of moving within a prescribed range in the vehicle width direction.

3. The vehicle control apparatus according to claim 1, further comprising:

a measurement section for measuring an elapsed time which elapses from a point at which it is judged that the host vehicle has overtaken and passed by the object until it is judged that the host vehicle is turning right or turning left, wherein when the actuation timing is advanced by the actuation change section, the shorter the elapsed time, the greater a degree of advancement of the actuation timing is made.

4. The vehicle control apparatus according to claim 1, further comprising:

a speed difference measurement section for calculating a difference in speed between the host vehicle and the object, with respect to a travel direction of the host vehicle, wherein when the actuation timing is advanced by the actuation change section, the smaller the difference in speed, the greater a degree of advancement of the actuation timing is made.

5. The vehicle control apparatus according to claim 1, wherein the collision avoidance control implements an alarm operation which actuates emission of an alarm sound by an alarm apparatus and implements a braking operation which actuates automatic braking by a braking apparatus, and wherein in advancing the actuations of an alarm operation and a braking operation relative to the case in which it is not judged that the host vehicle is turning right or left after it has been judged that the host vehicle is turning right or left, the actuation change section advances the actuation of the alarm operation to a greater degree than the advancement of the actuation of the braking operation.

6. The vehicle control apparatus according to claim 1, wherein the object detection section detects the object based on images captured by an image capture unit which defines the detection region in front of the host vehicle.

7. The vehicle control apparatus according to claim 1, further comprising:

a same object judgment section for determining whether the object that the host vehicle is judged to have overtaken and passed by, and the object that is judged to have a possibility of collision with the host vehicle are the same object, wherein the actuation change section advances the actuation timing on condition that it is determined that the object which the host vehicle is judged to have overtaken and passed by is the same as an object judged to have a possibility of collision with the host vehicle.

8. The vehicle control apparatus according to claim 1, wherein the overtaking judgment section judges whether, among the detected objects, there is the object that the host vehicle has overtaken and passed by, and that is recognized as being a pedestrian or a two-wheel host vehicle.

9. The vehicle control apparatus according to claim 1, the specific area comprises edge areas that are located along each side of the detection region with respect to the vehicle width direction.

10. The vehicle control apparatus according to claim 1, wherein the actuation timing of the collision avoidance control is advanced due to shortening a time required for performing a collision judgement by reducing a number of motion trajectory reference points used in calculating a motion trajectory of the object for the collision judgment.

11. The vehicle control apparatus according to claim 1, wherein if it is judged that a collision between the host vehicle and a pedestrian is likely, the actuation timing of the collision avoidance control is advanced when a cumulative number of times the pedestrian has been detected is above a predetermined threshold value.

12. A vehicle control method of performing collision avoidance control, when there is a possibility of collision between a host vehicle and an object positioned within a detection region that is set in front of the host vehicle, for preventing the host vehicle from colliding with the object, the method comprising:

an object detection step of detecting objects positioned within the detection region;

an overtaking judgment step of judging whether the host vehicle has overtaken and passed by the object that is among the objects detected in the detection region and that is capable of moving within a prescribed range in a vehicle width direction of the host vehicle;

a right turn/left turn judgment step of judging whether the host vehicle is turning right or turning left;

a direction change detection step of detecting a change in direction of the host vehicle for a state in which the host vehicle is judged to be turning right or turning left;

an operation change step of advancing an actuation timing of the collision avoidance control when it is judged that the host vehicle is turning right or turning left after it has been judged that the host vehicle has overtaken and passed by the object, relative to the actuation timing when it is not judged that the host vehicle has overtaken and passed by the object and relative to the actuation timing when it is judged that the host vehicle is not turning or turning left after it has been judged that the host vehicle has overtaken and passed by the object; and a position judgment step of determining, for the object that is judged to have a possibility of collision with the host vehicle, whether the object is positioned within a specific area within the detection region, in a case where the host vehicle makes the right or left turn after the host vehicle has overtaken and passed by the object, the specific area being on a side of a turning direction of the host vehicle, wherein:

the actuation change step advances the actuation timing in response to determining that the object is positioned within the specific area within the detection region; and during the operation change step in which the actuation timing is advanced, the smaller the change in direction, the greater a degree of advancement of the actuation timing is made.

* * * * *